(12) United States Patent
Shalam et al.

(10) Patent No.: US 7,909,397 B2
(45) Date of Patent: Mar. 22, 2011

(54) IN-VEHICLE DOCKING STATION FOR A PORTABLE MEDIA PLAYER

(75) Inventors: David M. Shalam, Syosset, NY (US); James R. Tranchina, Dix Hills, NY (US)

(73) Assignee: Audiovox Corporation, Hauppauge, NY (US)

( * ) Notice: Subject to any disclaimer, the term of this patent is extended or adjusted under 35 U.S.C. 154(b) by 434 days.

(21) Appl. No.: 11/649,121

(22) Filed: Jan. 3, 2007

(65) Prior Publication Data

US 2007/0108788 A1     May 17, 2007

Related U.S. Application Data

(63) Continuation-in-part of application No. 10/969,484, filed on Oct. 20, 2004, now Pat. No. 7,354,091, which is a continuation-in-part of application No. 10/699,334, filed on Oct. 31, 2003, now Pat. No. 6,899,365, which is a continuation-in-part of application No. 10/438,724, filed on May 15, 2003, now Pat. No. 7,245,274.

(60) Provisional application No. 60/756,260, filed on Jan. 4, 2006.

(51) Int. Cl.
  *A47C 7/62* (2006.01)
(52) U.S. Cl. .................................. 297/217.3; 297/217.1
(58) Field of Classification Search ............... 297/217.3, 297/217.1
  See application file for complete search history.

(56) References Cited

U.S. PATENT DOCUMENTS

| | | | |
|---|---|---|---|
| 3,019,050 A | 1/1962 | Spielman |
| 4,647,980 A | 3/1987 | Steventon et al. |
| 4,681,366 A | 7/1987 | Lobanoff |
| 4,702,519 A | 10/1987 | Lobanoff |
| 4,756,528 A | 7/1988 | Umashankar |
| 4,836,478 A | 6/1989 | Sweere |
| 4,843,477 A | 6/1989 | Mizutani et al. |
| 4,982,996 A | 1/1991 | Vottero-Fin et al. |
| 5,021,922 A | 6/1991 | Davis et al. |
| 5,214,514 A | 5/1993 | Haberkern |
| 5,255,214 A | 10/1993 | Ma |
| 5,267,775 A | 12/1993 | Nguyen |
| 5,335,076 A | 8/1994 | Reh et al. |

(Continued)

FOREIGN PATENT DOCUMENTS

DE     102004023636     12/2005

(Continued)

OTHER PUBLICATIONS

Notice of Allowance and Fee(s) due from corresponding U.S. Appl. No. 10/438,724, now U.S. Patent No. 7,245,275.

(Continued)

*Primary Examiner* — David Dunn
*Assistant Examiner* — Tania Abraham
(74) *Attorney, Agent, or Firm* — F. Chau & Associates, LLC (57) ABSTRACT

An entertainment system for a vehicle includes an entertainment console which includes a display and at least one docking station. The at least one docking station receives a portable media player at least partially therein and operatively connects the media player to the entertainment console. The entertainment system may be mounted within a vehicle for use therein or used at a location outside of a vehicle (e.g. home or office) based upon the preference of the user.

15 Claims, 5 Drawing Sheets

U.S. PATENT DOCUMENTS

| | | |
|---|---|---|
| 5,396,340 A | 3/1995 | Ishii et al. |
| 5,410,447 A | 4/1995 | Miyagawa et al. |
| 5,463,688 A | 10/1995 | Wijas |
| 5,507,556 A | 4/1996 | Dixon |
| 5,555,466 A | 9/1996 | Scribner et al. |
| 5,610,822 A | 3/1997 | Murphy |
| 5,667,179 A | 9/1997 | Rosen |
| 5,793,413 A | 8/1998 | Hylton et al. |
| 5,796,575 A | 8/1998 | Podwalny et al. |
| 5,842,715 A | 12/1998 | Jones |
| 5,949,345 A | 9/1999 | Beckert et al. |
| 6,058,288 A | 5/2000 | Reed et al. |
| 6,081,420 A | 6/2000 | Kim et al. |
| 6,092,705 A | 7/2000 | Meritt |
| 6,102,476 A | 8/2000 | May et al. |
| 6,134,223 A | 10/2000 | Burke et al. |
| D438,853 S | 3/2001 | Iino |
| 6,199,810 B1 | 3/2001 | Wu et al. |
| 6,216,927 B1 | 4/2001 | Meritt |
| 6,266,236 B1 | 7/2001 | Ku et al. |
| 6,292,236 B1 | 9/2001 | Rosen |
| 6,300,880 B1 | 10/2001 | Sitnik |
| 6,301,367 B1 | 10/2001 | Boyden et al. |
| 6,317,039 B1 | 11/2001 | Thomason |
| 6,337,913 B1 | 1/2002 | Chang |
| 6,339,455 B1 | 1/2002 | Allan et al. |
| 6,380,978 B1 | 4/2002 | Adams et al. |
| 6,409,242 B1 | 6/2002 | Chang |
| 6,419,379 B1 | 7/2002 | Hulse |
| 6,443,574 B1 | 9/2002 | Howell et al. |
| 6,587,127 B1 | 7/2003 | Leeke et al. |
| 6,665,163 B2 | 12/2003 | Yanagisawa |
| 6,666,492 B1 | 12/2003 | Schmidt et al. |
| 6,669,285 B1 | 12/2003 | Park et al. |
| 6,717,798 B2 * | 4/2004 | Bell et al. ............. 361/679.41 |
| 6,719,343 B2 | 4/2004 | Emerling et al. |
| 6,724,317 B1 | 4/2004 | Kitano et al. |
| 6,739,654 B1 | 5/2004 | Shen et al. |
| 6,754,070 B2 | 6/2004 | Chen |
| 6,754,183 B1 | 6/2004 | Razavi et al. |
| 6,758,521 B2 | 7/2004 | Inamura et al. |
| 6,871,356 B2 | 3/2005 | Chang |
| 6,899,365 B2 | 5/2005 | Lavelle et al. |
| 6,979,038 B1 | 12/2005 | Cho et al. |
| D515,522 S | 2/2006 | Vitito |
| 7,036,879 B2 | 5/2006 | Chang |
| 7,044,546 B2 | 5/2006 | Chang |
| 7,070,237 B2 | 7/2006 | Rochel |
| 7,084,932 B1 | 8/2006 | Mathias |
| 7,201,354 B1 | 4/2007 | Lee |
| 7,201,356 B2 | 4/2007 | Huang |
| 7,360,833 B2 | 4/2008 | Vitito |
| 7,379,125 B2 | 5/2008 | Chang |
| 7,627,343 B2 * | 12/2009 | Fadell et al. .............. 455/557 |
| 2001/0001083 A1 | 5/2001 | Helot |
| 2001/0044664 A1 | 11/2001 | Mueller et al. |
| 2002/0005897 A1 | 1/2002 | Kim |
| 2002/0024538 A1 * | 2/2002 | Bandaru et al. ............ 345/764 |
| 2002/0149905 A1 * | 10/2002 | Jackson, Jr. ............... 361/681 |
| 2002/0159270 A1 | 10/2002 | Lynam et al. |
| 2002/0186531 A1 | 12/2002 | Pokharna et al. |
| 2003/0021086 A1 | 1/2003 | Landry et al. |
| 2003/0042378 A1 | 3/2003 | Imamura et al. |
| 2003/0057749 A1 | 3/2003 | Buono |
| 2003/0111880 A1 | 6/2003 | Lambiaso |
| 2003/0117728 A1 | 6/2003 | Hutzel et al. |
| 2003/0128504 A1 | 7/2003 | Enners et al. |
| 2003/0137584 A1 | 7/2003 | Norvell et al. |
| 2003/0184137 A1 | 10/2003 | Jost |
| 2003/0193619 A1 | 10/2003 | Farrand |
| 2003/0194968 A1 | 10/2003 | Young |
| 2003/0198008 A1 | 10/2003 | Leapman et al. |
| 2003/0220091 A1 | 11/2003 | Farrand et al. |
| 2003/0229897 A1 | 12/2003 | Frisco et al. |
| 2004/0007906 A1 | 1/2004 | Park et al. |
| 2004/0032541 A1 | 2/2004 | Rochel |
| 2004/0085485 A1 | 5/2004 | Schedivy |
| 2004/0130616 A1 | 7/2004 | Tseng |
| 2004/0224638 A1 * | 11/2004 | Fadell et al. ................ 455/66.1 |
| 2004/0227695 A1 | 11/2004 | Schedivy |
| 2004/0227696 A1 | 11/2004 | Schedivy |
| 2004/0227861 A1 | 11/2004 | Schedivy |
| 2005/0005298 A1 | 1/2005 | Tranchina |
| 2005/0052046 A1 | 3/2005 | Lavelle et al. |
| 2005/0099547 A1 | 5/2005 | Vitito |
| 2005/0110313 A1 | 5/2005 | Vitito et al. |
| 2005/0204596 A1 | 9/2005 | Peng |
| 2005/0239434 A1 | 10/2005 | Marlowe |
| 2005/0242636 A1 | 11/2005 | Vitito |
| 2005/0242637 A1 | 11/2005 | Vitito |
| 2005/0242638 A1 | 11/2005 | Vitito |
| 2005/0281414 A1 | 12/2005 | Simon et al. |
| 2006/0047426 A1 | 3/2006 | Vitito |
| 2006/0098403 A1 | 5/2006 | Smith |
| 2006/0109388 A1 | 5/2006 | Sanders et al. |
| 2006/0112144 A1 | 5/2006 | Ireton |
| 2006/0148575 A1 | 7/2006 | Vitito |
| 2007/0047198 A1 * | 3/2007 | Crooijmans et al. .......... 361/686 |
| 2007/0057541 A1 | 3/2007 | Huang |
| 2007/0101039 A1 * | 5/2007 | Rutledge et al. .............. 710/303 |
| 2007/0247800 A1 | 10/2007 | Smith et al. |
| 2008/0170165 A1 | 7/2008 | Lee et al. |
| 2009/0115233 A1 | 5/2009 | Tuccinardi et al. |

FOREIGN PATENT DOCUMENTS

| | | |
|---|---|---|
| EP | 1 550 583 | 7/2005 |
| FR | 2817812 | 6/2002 |
| FR | 2829980 | 3/2003 |
| JP | 2001047921 | 2/2002 |
| WO | WO0038951 | 7/2000 |
| WO | WO2004074577 | 9/2002 |
| WO | WO03029050 | 4/2003 |

OTHER PUBLICATIONS

Office Action mailed Jan. 10, 2007 from corresponding U.S. Appl. No. 10/438,724, now U.S. Patent No. 7,245,275.

Office Action mailed Jun. 5, 2006 from corresponding U.S. Appl. No. 10/438,724, now U.S. Patent No. 7,245,275.

Office Action mailed Oct. 4, 2005 from corresponding U.S. Appl. No. 10/438,724, now U.S. Patent No. 7,245,275.

Notification of Transmittal of International Preliminary Report on Patentability for Application No. PCT/US04/10555; Date of Mailing: Apr. 12, 2006.

Notification Concerning Transmittal of International Application as Published or Republished for Application No. PCT/US04/10555; Date of Mailing: Dec. 29, 2005.

International Search Report for International Application No. PCT/US06/43300; Date of Mailing Sep. 21, 2007.

Written Opinion of the International Searching Authority for International Application No. PCT/US06/4330; Date of Mailing Sep. 21, 2007.

Office Action mailed Jul. 13, 2007 from corresponding U.S. Appl. No. 10/969,484.

Office Action mailed Aug. 2, 2006 from corresponding U.S. Appl. No. 10/969,484.

Office Action mailed Mar. 15, 2006 from corresponding U.S. Appl. No. 10/969,484.

Office Action mailed Jan. 23, 2007 from corresponding U.S. Appl. No. 10/969,484.

International Search Report for International Application No. PCT/US05/37356; Date of Mailing Jul. 24, 2006.

Written Opinion of the International Searching Authority for International Application No. PCT/US05/37356; Date of Mailing Jul. 24, 2006.

Supplemental Notice of Allowance Date of Mailing Mar. 4, 2005 from corresponding U.S. Appl. No. 10/699,334.

Notice of Allowance Date of Mailing Oct. 14, 2004 from corresponding U.S. Appl. No. 10/699,334.

Office Action Date of Mailing Aug. 2, 2004 from corresponding U.S. Appl. No. 10/699,334.

International Search Report for International Application No. PCT/US07/00059; Date of Mailing Oct. 19, 2007.

Written Opinion of the International Searching Authority for International Application No. PCT/US07/00059; Date of Mailing Oct. 19, 2007.
Notice of Allowance and Fee(s) due from corresponding U.S. Appl. No. 10/438,724, now U.S. Patent No. 7,245,275.
Office Action mailed Jan. 10, 2007 from corresponding U.S. Appl. No. 10/438,724, now U.S. Patent No. 7,245,275.
Office Action mailed Jun. 5, 2006 from corresponding U.S. Appl. No. 10/438,724, now U.S. Patent No. 7245,275.
Office Action mailed Oct. 4, 2005 from corresponding U.S. Appl. No. 10/438,724, now U.S. Patent No. 7,245,275.
Notification of Transmittal of International Preliminary Report on Patentability for Application No. PCT/US04/10555; Date of Mailing: Apr. 12, 2006.
Notification Concerning Transmittal of International Application as Published or Republished for Application No. PCT/US04/10555; Date of Mailing: Dec. 29, 2005.
International Search Report for International Application No. PCT/US06/43300; Date of Mailing Sep. 21, 2007.
Written Opinion of the International Searching Authority for International Application No. PCT/US06/4330; Date of Mailing Sep. 21, 2007.
Notice of Office Action dated Feb. 26, 2008 to related U.S. Appl. No. 11/072,171.
Office Action mailed Mar. 11, 2009 corresponding U.S. Appl. No. 11/072,171.
Office Action mailed Jun. 22, 2009 corresponding U.S. Appl. No. 11/557,177.
International Search Report from corresponding PCT Application No. PCT/US2006/43432.
Office Action mailed Oct. 27, 2006 corresponding U.S. Appl. No. 10/688,611.
Office Action mailed Jun. 16, 2006 corresponding U.S. Appl. No. 10/688,611.
International Search Report from PCT/US2004/34371.
Office Action mailed Sep. 12, 2008 corresponding U.S. Appl. No. 11/072,171.
Office Action mailed Sep. 22, 2008 corresponding U.S. Appl. No. 10/808,659.
Supplementary EP Search Report PCT/US20006043300 dated Jun. 15, 2009.
Office Action mailed Jul. 13, 2007 from corresponding U.S. Appl. No. 10/688,611.
Final Office Action mailed Sep. 1, 2009 from corresponding U.S. Appl. No. 11/072,171.
Office Action mailed Oct. 6, 2009 from corresponding U.S. Appl. No. 11/593,380.
Office Action mailed Dec. 24, 2009 from corresponding U.S. Appl. No. 11/072,171.
Office Action mailed Jan. 7, 2010 from corresponding U.S. Appl. No. 11/557,177.
Office Action issued from the European Patent Office (EPO) on Feb. 18, 2010 corresponding to European Patent Application No. 06837036.0 (PCT US200604300).
Volkswagen AG: Grenzenloser Musikgenuss. Mobiles Klangwunder. Der Golf Und Der Apple IPOD, Announcement Volkswagen, No. 592. 1240.13.01, Aug. 1, 2005, p. 1.
European Search Report dated Mar. 26, 2010 from corresponding European Patent Application No. 07716231.1-2202.
Notice of Allowance and Fee(s) due from corresponding U.S. Appl. No. 10/438,724, now U.S. Patent No. 7,245,275, Apr. 4, 2007.
Supplementary European Search Report dated Oct. 4, 2010 for Application No. EP06827547.

* cited by examiner

IN-VEHICLE DOCKING STATION FOR A PORTABLE MEDIA PLAYER

CROSS-REFERENCE TO RELATED APPLICATIONS

This application claims priority to U.S. Provisional Application Ser. No. 60/756,260 filed Jan. 4, 2006, the contents of which are hereby incorporated by reference herein in their entirety. This application is also a continuation-in-part (CIP) of U.S. application Ser. No. 10/969,484, filed Oct. 20, 2004, now U.S. Pat. No. 7,354,091 which is a continuation-in-part of U.S. application Ser. No. 10/699,334, filed on Oct. 31, 2003 now U.S. Pat. No. 6,899,365, which is a continuation-in-part of U.S. application Ser. No. 10/438,724, filed May 15, 2003 now U.S. Pat. No. 7,245,274, the contents of which are hereby incorporated by reference herein in their entirety.

BACKGROUND OF THE INVENTION

1. Technical Field

The present disclosure relates to entertainment systems, and more particularly to vehicle entertainment systems which include entertainment consoles having a docking station capable of docking a media player (e.g. IPOD®, MP3 player or MP4 player) within the vehicle and to such entertainment systems that are also usable outside of a vehicle at a desired location (e.g. home or office).

2. Discussion of the Related Art

As society becomes more mobile and therefore spends a greater amount of time traveling and away from home, demand rises for electronic appliances and devices outside the home environment. For example, video screens have been mounted in the headrests of vehicles, facilitating video entertainment on the road. These video screens are connected to video players located, for example, in the glove box of the vehicle. However, the video player and video screen cannot be removed from the vehicle. Thus, videos may only be viewed with such systems when occupying the vehicle.

Therefore, a need exists for an entertainment system which includes a video display (e.g. LCD) and a docking station which is capable of docking a media player (e.g. IPOD®) within a vehicle (e.g. a headrest or ceiling of a vehicle) for use therein and which may also be removed from the vehicle for use outside of the vehicle, such as for example, in the home or office.

SUMMARY OF THE INVENTION

In accordance with an exemplary embodiment of the present invention, an entertainment system for a vehicle is provided. The entertainment system includes an entertainment console which includes a display and at least one docking station. The at least one docking station receives a portable media player at least partially therein and operatively connects the media player to the entertainment console.

In accordance with an exemplary embodiment of the present invention, an entertainment system mounted within a headrest of a vehicle for docking a media player within the vehicle is provided. The entertainment system includes a housing mounted within the headrest of the vehicle and an entertainment console which includes a video display and a docking station. The docking station receives a portable media player at least partially therein and operatively connects the media player to the entertainment console. The docking station includes at least one of a slot within the entertainment console or a port within the entertainment console. In addition, the entertainment console is housed within the housing.

In embodiments of the present invention, the entertainment console is pivotably coupled to the housing.

In accordance with an exemplary embodiment of the present invention, an entertainment system mounted overhead to a ceiling within a vehicle for docking a portable media player within the vehicle is provided. The entertainment system includes an entertainment console which includes a video display and at least one docking station. The least at one docking station is adapted to receive a portable media player at least partially therein for operatively connecting the media player to the entertainment console. Moreover, the entertainment console is connected to the ceiling of the vehicle and the display is pivotably coupled to the entertainment console.

In accordance with another exemplary embodiment, an in-vehicle docking system for a portable media player is provided. The in-vehicle docking system includes a docking unit located within the interior of a vehicle. The docking unit includes a docking station adapted for being connected to a media player to operatively connect the media player to an external device which is located away from the docking unit within the vehicle.

BRIEF DESCRIPTION THE DRAWINGS

Exemplary embodiments of the present invention can be understood in more detail from the following detailed description taken in conjunction with the accompanying drawings, in which.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as being limited to the exemplary embodiments set forth herein.

Exemplary embodiments of the present invention relate to an in-vehicle docking station for a portable media player. For example, the docking station is coupled to an entertainment console mounted overhead or in a headrest of a seat of a vehicle, such as, for example, an automobile, minivan or sport utility vehicle (SUV). In accordance with an embodiment, the docking station includes a slot or recess which receives a portable media player, such as, for example, an IPOD®. The slot or recess includes an electrical connector, which mates with a corresponding electrical connector on the portable media player.

Referring to FIGS. 1-4, a headrest 10 includes an entertainment console 100 mounted therein. The entertainment console 100 is coupled to a housing 110 via a hinge 115 located on left and right sides of the entertainment console 100. The hinge 115 can be located at bottom, top or middle portions of the housing 110. Alternative hinges known to those of ordinary skill in the art may be used and the angle range of rotation of the entertainment console 100 may be varied depending on design preferences. The housing is coupled to the headrest 10 using fixing devices, such as, for example, screws 150.

The entertainment console 100 includes a display 130 having a screen for displaying video. The screen is preferably an LCD type display, but may be another type of display, such as, for example, an organic LED or electro-luminescent display.

The entertainment console 100 includes a slot 140 for receiving a portable media player, such as, for example, an IPOD® or any other type of MP3 or MP4 player, that plays video and/or audio programs, which are downloaded and stored on the media player's memory. For example, an MP4 player which may be used in accordance with embodiments of the present invention may include but is not limited to having features such as a color super-twist nematic (CSTN) screen, mass memory of 128M-2 G, movie and mpegtv (MTV) player, synchronized video and audio display, support for AMV video file format (e.g. a video file format produced for MP3/MP4/MTV players), USB 2.0, fast download speeds, ID3 support, lyrics display, recording and repeating function, electronic album, FM radio function, e-book function, several play modes and EQ modes, multilingual support (English, Japanese, French, German, Italian, Portuguese, Polish, Spanish, etc.), driver free above Win98, built in rechargeable Li-polymer battery, and a size of 90*40*8 mm.

The slot 140 is preferably located on a top side of the entertainment console 100 so that the slot is exposed when the entertainment console is pivoted outward away from the housing 110. Alternatively, the slot may be located on left, right, bottom, front or back sides of the entertainment console 100.

Figure 3:
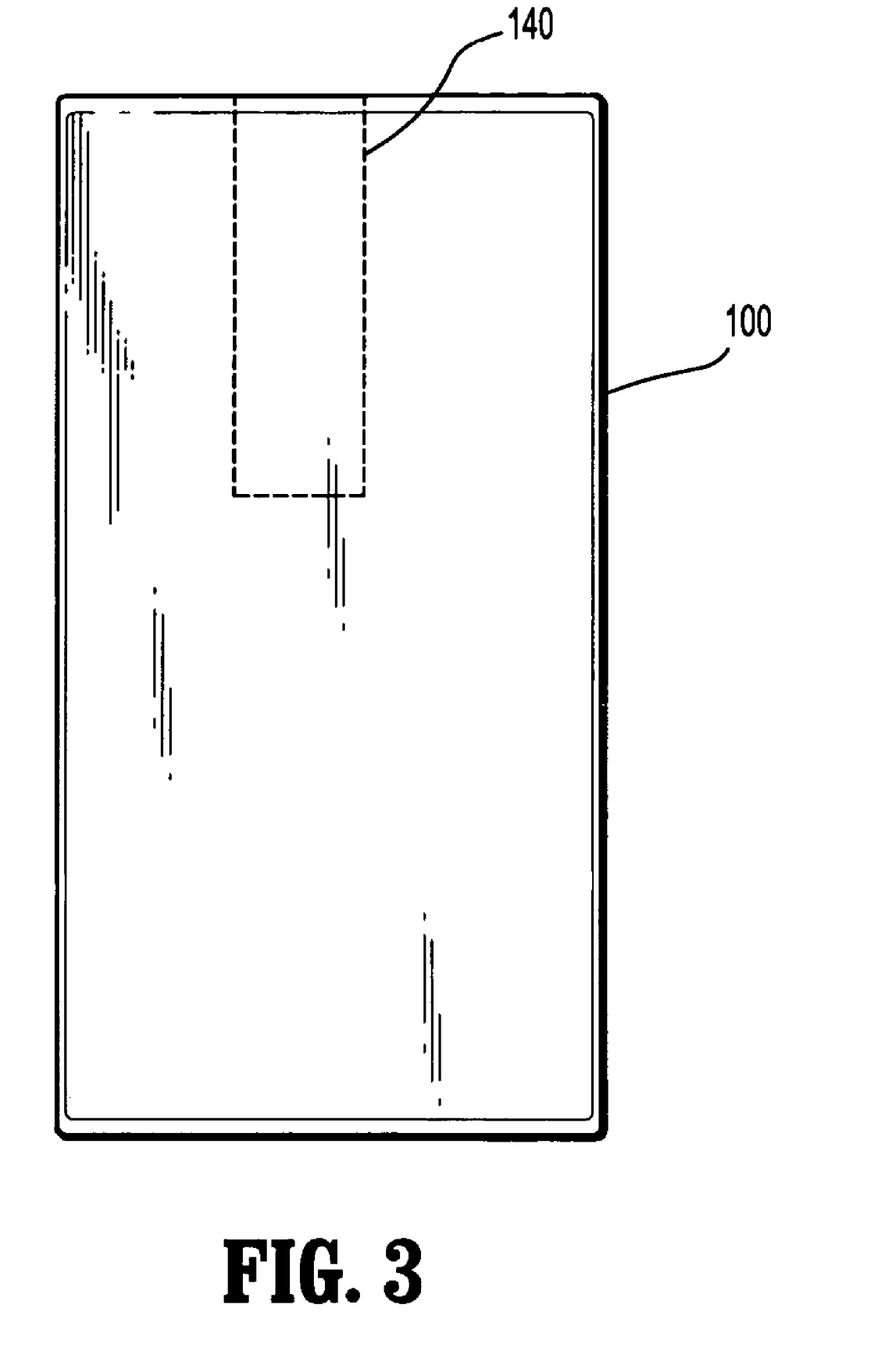
FIG. 3 shows a side view of the entertainment console of FIG. 1 including a slot for the portable media player, according to an embodiment of the present invention.
Figure 4:
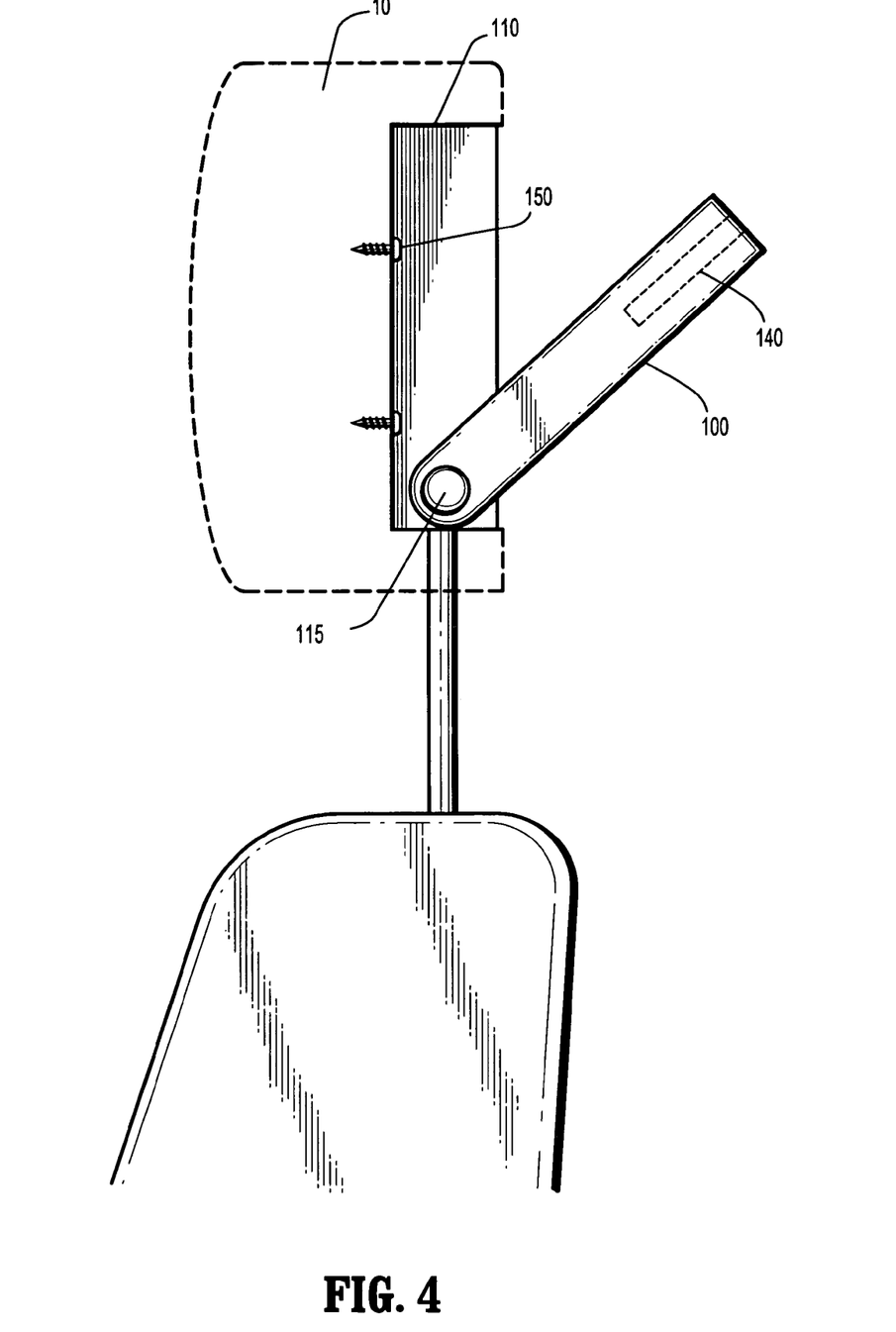
FIG. 4 shows a side view of the entertainment console of FIG. 1 mounted in a headrest and pivoted outward, according to an embodiment of the present invention.

Referring to FIG. 3, when the entertainment console 100 is in the pivoted position, a user inserts the portable media player into the slot 140 until the portable media player is fixed therein. The user then pivots the entertainment console 100 back into the housing 110 so that the entertainment console is substantially flush with the back of the headrest and in a position for a user (e.g., a backseat passenger) to view the display 130. The portable media player can be released from the slot 140 by pressing a release button 143, which is coupled to a spring-loaded mechanism for pushing the portable media player out of the slot 140. Alternatively, the depth of the slot can be smaller than the height of the portable media player, such that the media player does not sit flush with the side of the entertainment console, and is able to be grabbed and pulled out by a user without the aid of a spring loaded mechanism.

The slot 140 includes a connector 141 at a bottom portion thereof, or in any suitable location so as to mate with a corresponding connector on the portable media player. The connector 141 includes contacts for mating with corresponding contacts on the portable media player. For example, the connector 141 includes a metal pin array to mate with a corresponding male or female pin array located on the portable media player. It is to be understood that the connector 141 may be any type of standardized connection for connecting to the portable media player.

Data from the media player, such as, for example, audio, video and meta data is supplied via the connector 141 to the entertainment console 100. In accordance with the received data, the display 130 displays a video program and/or meta data, and outputs corresponding audio through speakers (not shown) attached to the display 130 and/or to entertainment console 100. Alternatively, audio can be supplied via the connector 141 to a vehicle sound system, which is electrically connected to the entertainment console 100 and the connector 141. Further, audio signals can be supplied via the connector 141 to an infrared or radio frequency wireless transmitter (not shown), which can format the audio signals for wireless transmission and wirelessly transmit the signals to a receiver located in, for example, wireless headphones.

Figure 1:
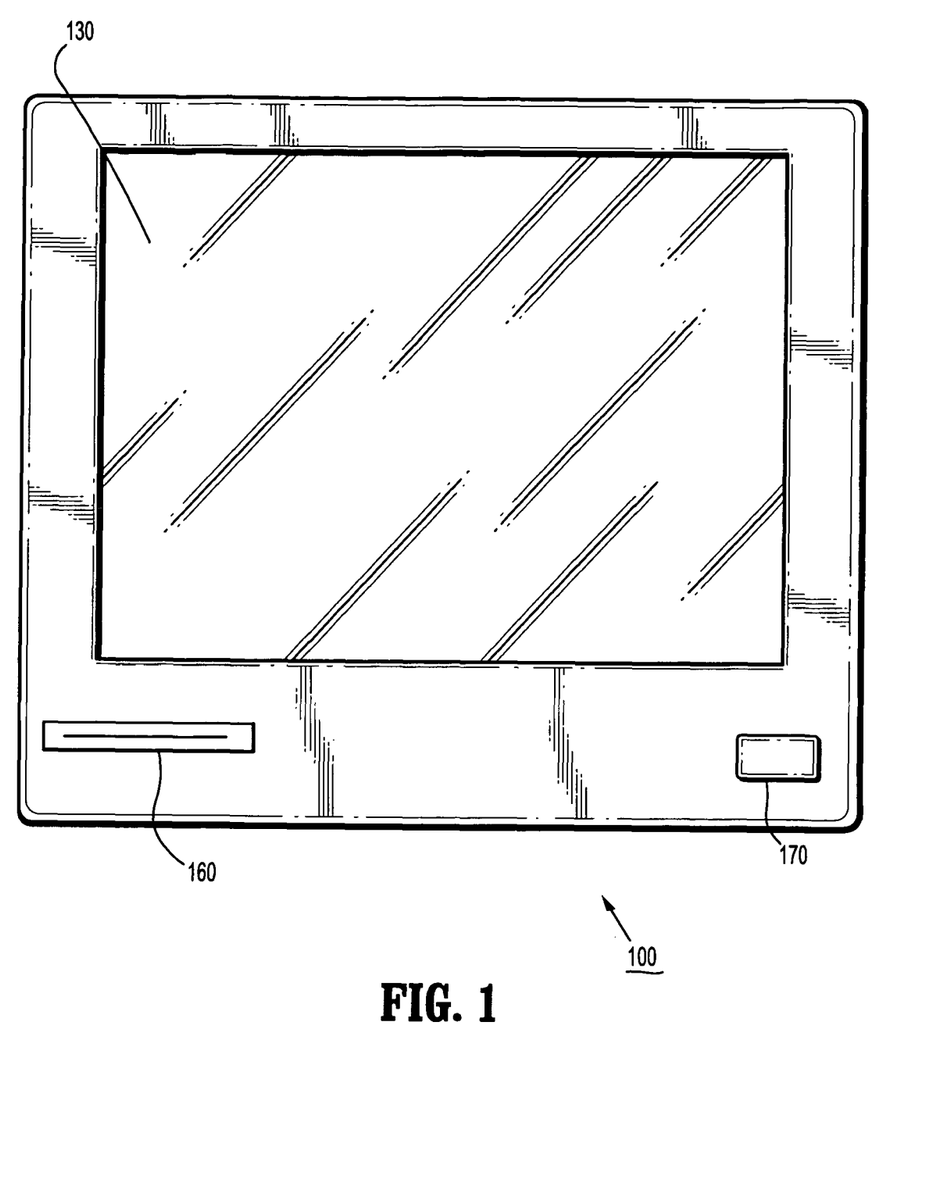
FIG. 1 shows a front view of an entertainment console, which mounts in a headrest of a vehicle, according to an embodiment of the present invention.
Figure 2:
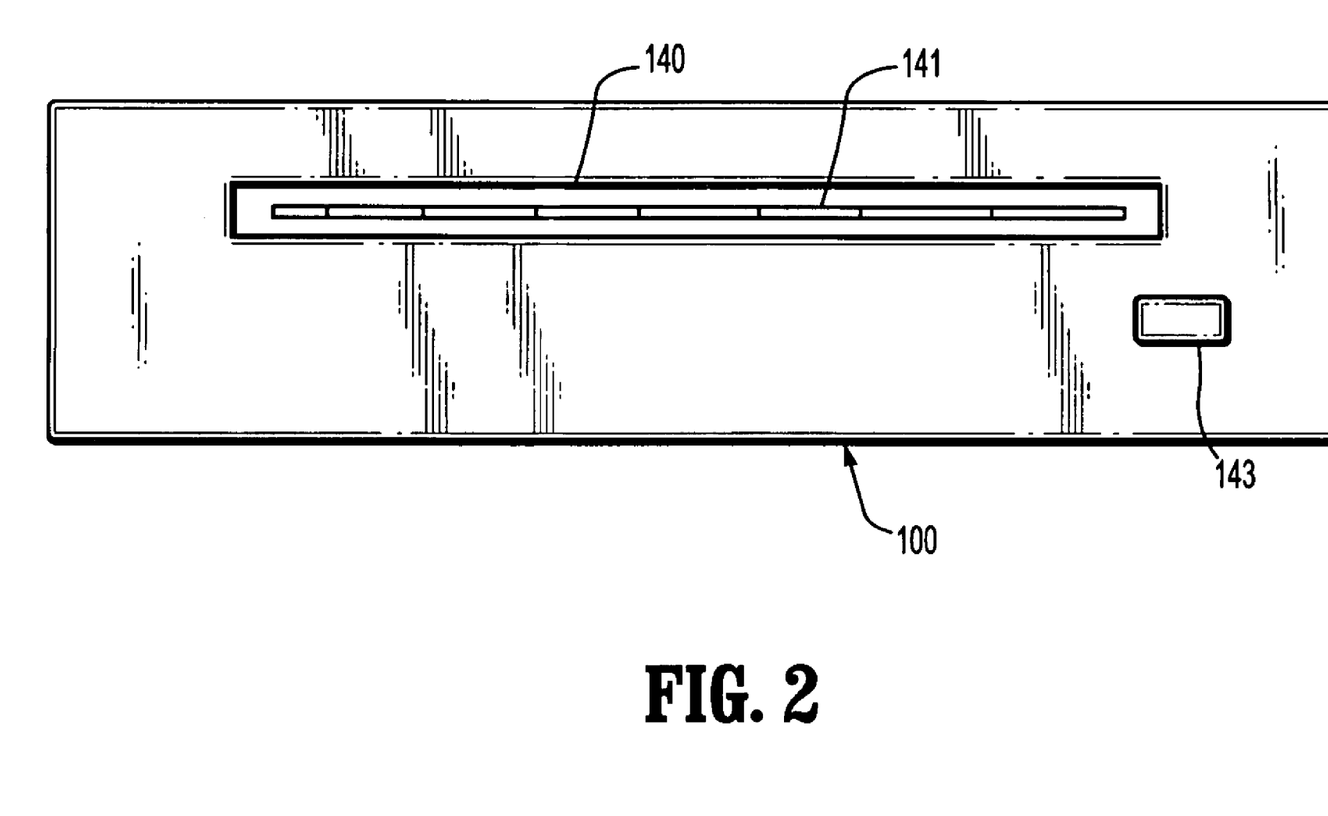
FIG. 2 shows a top view of the entertainment console of FIG. 1 including a slot for the portable media player, according to an embodiment of the present invention.

Control signals, such as play, stop, pause, rewind, fast-forward are transferred from the entertainment console 100 to the portable media unit via the connector 141. The control signals can be received using a remote control, which sends control signals to an infrared receiver 170 located on the front face of the console 100. Alternatively, control buttons for controlling playing of programs can be located directly on the console 100.

Power can be supplied to the portable media player, via the connector 141, from a power source, such as, for example, the vehicle's battery. The entertainment console 100 can be electrically connected to, for example, a wire harness of the vehicle to receive power from the vehicle. When inserted in the slot 140, the portable media player may operate using the vehicle's power and may also charge its batteries.

In another alternative embodiment, the portable media player is connected to the entertainment console 100 via a port 160 located on the front face of the entertainment console 100, whereby a wire connector running from the portable media player is plugged into the port 160. The port 160 may be located in any convenient location within reach of a user. Like the connector 141, data, such as video, audio and meta data can be transferred from the portable media player to the entertainment console via the port 160. Further, control signals and power may be transferred through the port 160 to the portable media player.

The port 160 may be, for example, a universal serial bus (USB) type port and include contacts for mating with corresponding contacts on a USB connector coupled to the portable media player. It is to be understood that the port 160 may be any type of standardized connection for transferring multimedia data and/or power from and to the portable media player.

Figure 5:
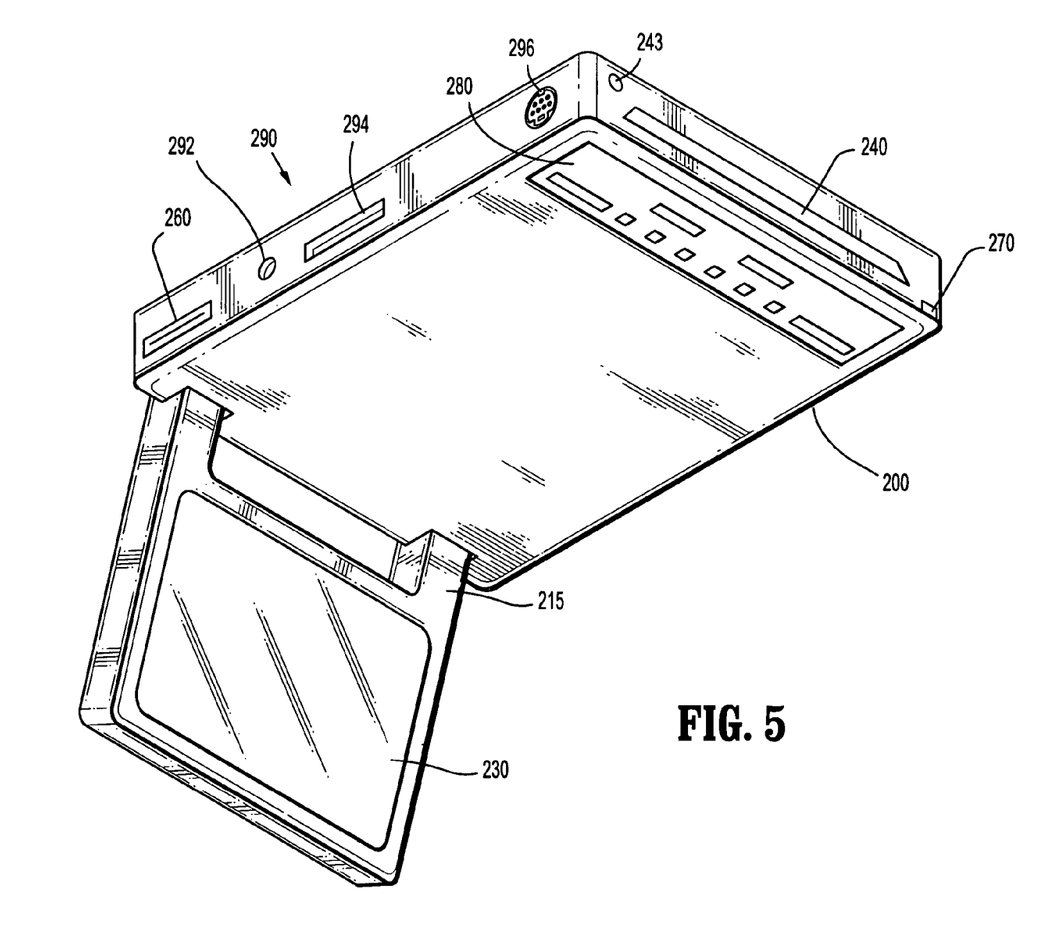
FIG. 5 shows a perspective view of an entertainment console, including a slot for the portable media player, which is mounted overhead in a vehicle, according to an embodiment of the present invention.

Referring to FIG. 5, an entertainment console 200 is mounted overhead in a vehicle, for example, to a vehicle ceiling. The entertainment console 200 may be coupled to the vehicle ceiling using fixing devices, such as, for example, screws.

The entertainment console 200 includes a display 230 having a screen for displaying video. Like the display 130, the screen is preferably an LCD type display, but may be another type of display, such as, for example, an organic LED or electro-luminescent display. The display 230 is pivotally coupled to the entertainment console 200, using a hinge mechanism 215. The display 230 may be folded such that the screen rests on the console 200 when not in use. Alternative hinges known to those of ordinary skill in the art may be used and the angle range of rotation of the display 230 may be varied depending on design preferences.

Like the entertainment console 100, the entertainment console 200 includes a slot 240 for receiving a portable media player. The slot 240 is preferably located on a front face of the entertainment console 200. Alternatively, the slot may be located on left, right, bottom, or back sides of the entertainment console 200.

The portable media player can be released from the slot 240 by pressing a release button 243, which is coupled to a spring-loaded mechanism for pushing the portable media player out of the slot 240. Alternatively, the depth of the slot can be smaller than the height of the portable media player, such that the media player does not sit flush with the face of the entertainment console, and is able to be grabbed and pulled out by a user without the aid of a spring loaded mechanism.

Like the slot 140, the slot 240 includes a connector having contacts for mating with corresponding contacts on the portable media player, so that power can be supplied to the portable media player and data from the media player can be supplied via the connector to the entertainment console 200. The display 230 displays a video program and/or meta data received from the portable media player, and outputs corresponding audio through speakers (not shown) attached to the display 230 and/or to entertainment console 200. Alternatively, audio can be supplied via the connector to a vehicle sound system, which is electrically connected to the entertainment console 200 and the connector. Further, audio signals can be supplied via the connector to an infrared or radio frequency wireless transmitter (not shown) for wireless transmission of audio signals as described above.

Control signals, such as play, stop, pause, rewind, fast-forward are transferred from the entertainment console 200 to the portable media unit via the connector. The control signals can be received using a remote control, which sends control signals to an infrared receiver 270 located on the front face of the console 200. Alternatively, control buttons 280 for controlling playing of programs can be located directly on the console 200.

Like the entertainment console 100, the entertainment console 200 can be electrically connected to, for example, a wire harness of the vehicle to receive power from the vehicle. When inserted in the slot 240, the portable media player may operate using the vehicle's power and may also charge its batteries.

In another alternative, the portable media player is connected to the entertainment console 200 via a port 260 located on the side of the entertainment console 200, whereby a wire connector running from the portable media player is plugged into the port 260. The port 260 may be located in any convenient location within reach of a user. Like the connector, data can be transferred from the portable media player to the entertainment console via the port 260. Further, control signals and power may be transferred through the port 260 to the portable media player.

Like the port 160, the port 260 may be, for example, a universal serial bus (USB) type port and include contacts for mating with corresponding contacts on a USB connector coupled to the portable media player.

It is further noted that in some embodiments of the present invention, the entertainment consoles 100, 200 can also act as a universal dock, in that they may be adapted to accommodate/fit several different models of each type of media player (e.g. several different IPOD® models) within the same docking station of the entertainment console. For example, in some embodiments, through the use of interchangeable inserts or dock adapters which correspond to a particular media player, a user may place one of these inserts or adapters into the docking station, e.g. the slot 140 or 240 to be able to dock that particular media player model within the docking station of the entertainment console 100, 200. Then, if desired, the user can replace the media player model currently inserted into the slot of the entertainment console, with a different media player model by simply removing the insert/adapter and first media player model and then placing a new insert/adapter which corresponds to the next media player model to be inserted into the slot. Some of these inserts or adapters may be sold with the media player together or may be purchased separately. Accordingly, entertainment consoles of embodiments of the present invention may be used with a wide range of media player models.

Furthermore, in other exemplary embodiments of the present invention, the entertainment consoles may be positioned in other locations of a vehicle as well, such, for example, in a center console, or in a vehicle dashboard. In addition, a slot for receiving the portable media player may be positioned remote from a display positioned elsewhere in the vehicle. Also, the entertainment console may be connected to more than one display.

Moreover, entertainment consoles of embodiments of the present invention, including those embodiments depicted in FIGS. 1-5, may further include a data output assembly which connects to an external device or devices away from the entertainment console (e.g. to another display screen within the vehicle or to a vehicle sound system) for outputting data from the media player to the external device. For example, as shown in FIG. 5, in some embodiments, the data output assembly 290 may include a line out port 292, a dock connector cable connection 294 and an S-video out connector 296. It is noted that the embodiments of the present invention are not limited to the above structure for the data output assembly 290. A description of how the data output assembly 290 may be used in accordance with embodiments of the present invention is set forth below by way of example only and is not meant to limit the scope of the present invention.

For example, one may view video from the media player on another display located within the vehicle and away from the entertainment console 100, 200 by connecting an AV cable to the line out port 292 of the data output assembly 290 of the entertainment console and also to the other display located within the vehicle. Moreover, one may listen to audio data from the media player docked within the entertainment console 100, 200 on a vehicle sound system by connecting an audio cable to the line port 292 of the data output assembly 290 of the entertainment console and to a vehicle sound system. Also, the dock connector cable connection 294 may be used, for example, to connect the media player to a computer within the vehicle or to a power adapter within the vehicle using a USB cable. Additionally, one may view video from the media player docked within the entertainment console 100, 200 on another display located within the vehicle away from the entertainment console 200 by connecting an S-video cable to the S-Video out 296 of the data output assembly 290 of the entertainment console 100, 200 and to the other display within the vehicle. It is further noted that the data output assembly on the entertainment console allows for the entertainment console to be connected to multiple external devices simultaneously.

In alternative embodiments of the present invention, an entertainment console such as for example, the entertainment consoles 100, 200 of the embodiments of FIGS. 1-5, may be used outside of a vehicle instead of being mounted therein. For example, in some embodiments, the entertainment console 100 or 200 may be used outside of the vehicle wherein data such as video data and audio data obtained from the media player, e.g. IPOD®, connected to the docking station (e.g. slot or port) of the entertainment console is displayed on the display of the entertainment console and also output through speakers of the entertainment console, thereby providing an out of vehicle display. In other words, data received from the media player may be played directly on entertainment console outside of the vehicle via the display and speakers of the entertainment console. The entertainment console in these embodiments may also control the playing of programs or control the data which is received from the media player via, e.g., control buttons and/or by remote control in a similar fashion as described in the in vehicle embodiments depicted in FIGS. 1-5.

In an embodiment, the entertainment console 100, 200 can be removed from the headrest or overhead portion of the vehicle to be operated outside of the vehicle.

Furthermore, in certain embodiments of the present invention, an entertainment console such as for example, the entertainment consoles 100, 200 of the embodiments of FIGS. 1-5 may be used outside of a vehicle by connecting the entertainment console to an external device such as, for example, to a home computer, a home theater system, a television set or a stereo for being able to view or listen to the data received from the media player on the external device at home, the office or other desired location. In some embodiments, the connection of the entertainment console to the external device may be accomplished via the data output assembly 290 in a similar fashion as mentioned with regard to the in-vehicle embodiments of FIG. 1-5. A discussion regarding how the data assembly of the entertainment console may be used outside of a vehicle in accordance with embodiments of the present invention is set forth below by way of example only and is not meant to limit the scope of the present invention.

For example, the entertainment console could be connected to an external device or devices such as, for example, speakers, a stereo or a television set in the home or office by connecting an AV cable to the line out port 292 of the data output assembly 290 of the entertainment console and to the external device such that data (e.g. video or audio data) from the media player is outputted to these external devices for viewing and/or listening to this data on the external device. In addition, the entertainment console could also be connected to a television set by connecting an S-video cable to the S-video out port 296 of the data output assembly 290 of the entertainment console and to the television set. Moreover, the entertainment console could also be connected to a computer, (e.g. a personal computer (PC)) by connecting a USB cable to the dock connector cable connection 294 of the data output assembly and to the computer. It is again noted that the entertainment console may be connected to multiple external devices simultaneously.

In other embodiments, a user may alternate between mounting the entertainment console within a vehicle for use therein and then removing the entertainment console from the vehicle for use outside of the vehicle. In still other embodiments, regardless of whether the entertainment console is being used in or out of a vehicle, data (e.g. audio or video) from the portable media player connected to the docking station of the entertainment console may be downloaded into a memory of entertainment console and stored therein. This data may be later retrieved and played back from the entertainment console, even if the media player has been removed from connection with the entertainment console.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. An entertainment system mounted within a headrest of a vehicle for docking a media player within the vehicle comprising:
    a housing mounted within the headrest of the vehicle; and
    an entertainment console which includes a video display and a docking station, wherein the docking station receives a media player at least partially therein and operatively connects the media player to the entertainment console, the docking station including at least one of a slot within the entertainment console or a port within the entertainment console,
wherein the entertainment console is housed within the housing, and wherein the entertainment console having the docking station therein is removable from the housing mounted within the headrest of the vehicle to be operated outside of the vehicle, wherein the entertainment console is adapted to download data from the media player into a memory of the entertainment console for storage therein such that data received from the media player may be viewed and listened to outside of the vehicle using the entertainment console even when the media player has been removed from connection with the entertainment console.

2. The entertainment system of claim 1, wherein the entertainment console is pivotably coupled to the housing.

3. The entertainment system of claim 2, wherein the slot is accessed by pivoting the entertainment console with respect to the housing.

4. The entertainment system of claim 1, wherein the docking station comprises the slot, and wherein the slot includes an electrical connector which mates with a corresponding electrical connector of the removable media player such that the entertainment console and the media player are operatively connected to each other.

5. The entertainment system of claim 4, wherein audio data from the media player is supplied via the electrical connector to a sound system of the vehicle, which is electrically connected to the entertainment console.

6. The entertainment system of claim 1, wherein the portable media player comprises one of an MP3 player or an MP4 player.

7. The entertainment system of claim 1, wherein the docking station comprises the port, and wherein the port receives a wire connector from the media player to operatively connect the entertainment console to the media player.

8. The entertainment system of claim 7, wherein the port comprises a universal serial bus (USB) port and includes contacts for mating with corresponding contacts on a USB connector coupled to the portable media player.

9. The entertainment system of claim 1, further comprising a data output assembly disposed on the entertainment console for being connected to a device which is external to the entertainment console to output data from the media player to the external device.

10. The entertainment system of claim 9, wherein the external device comprises at, least one of a video display located within the vehicle and away from the entertainment console or a vehicle sound system.

11. The entertainment system of claim 9, wherein the data output assembly comprises at least one of a line out port, a dock connector cable connection slot or an S-video out port.

12. The entertainment system of claim 9, wherein the entertainment console is operatively connected to one or more displays positioned within the vehicle and away from the entertainment console via the data output assembly.

13. The entertainment system of claim 1, wherein the entertainment console further comprises an infrared receiver located on a front face of the entertainment console, and wherein said infrared receiver receives control signals from a remote control for controlling playing of programs from the media player on the entertainment console.

14. The entertainment system of claim 1, wherein the entertainment console is electrically connected to a wire harness of the vehicle to receive power from the vehicle, and wherein the media player operates using the power received from the vehicle.

15. An entertainment system mounted within a headrest of a vehicle for docking a media player within the vehicle comprising:

a housing mounted within the headrest of the vehicle; and an entertainment console which includes a video display and a docking station, wherein the docking station receives a media player at least partially therein and operatively connects the media player to the entertainment console, the docking station including at least one of a slot within the entertainment console or a port within the entertainment console, wherein the entertainment console is housed within the housing, and wherein the docking station of the entertainment console is adapted to receive therein a variety of interchangeable inserts or dock adapters which correspond to a particular media player such that the docking station is adapted to accommodate/fit several different models of media player within the docking station, thereby constituting a universal dock, wherein the entertainment console having the docking station therein is removable from the housing mounted within the headrest of the vehicle to be operated outside of the vehicle, and wherein the entertainment console is adapted to download data from the media player into a memory of the entertainment console for storage therein such that data received from the media player may be viewed and listened to outside of the vehicle using the entertainment console even when the media player has been removed from connection with the entertainment console.

* * * * *